(12) United States Patent
Renzoni

(10) Patent No.: US 6,745,971 B1
(45) Date of Patent: Jun. 8, 2004

(54) SPOOLING DEVICE FOR AN OPTICAL FIBER JUMPER CABLE

(76) Inventor: Toby K. Renzoni, 13 Woodland St., Enfield, CT (US) 06082

(*) Notice: Subject to any disclaimer, the term of this patent is extended or adjusted under 35 U.S.C. 154(b) by 39 days.

(21) Appl. No.: 09/960,240

(22) Filed: Sep. 20, 2001

Related U.S. Application Data

(60) Provisional application No. 60/234,515, filed on Sep. 20, 2000, and provisional application No. 60/287,070, filed on Apr. 27, 2001.

(51) Int. Cl.$^7$ ............................................. B65H 75/38
(52) U.S. Cl. ............................. 242/388.1; 242/388.4; 242/395; 242/398; 242/401
(58) Field of Search .................... 242/388.1, 388.4, 242/395, 398, 401, 588.6; 206/396, 397, 409

(56) References Cited

U.S. PATENT DOCUMENTS

| | | | | |
|---|---|---|---|---|
| 2,017,176 A | * | 10/1935 | Andrews | 206/396 |
| 3,693,784 A | * | 9/1972 | Holmes | 206/409 |
| 6,079,657 A | * | 6/2000 | Hwang | 242/388.1 |

* cited by examiner

Primary Examiner—John Q. Nguyen
(74) Attorney, Agent, or Firm—Christensen O'Connor Johnson Kindness PLLC

(57) ABSTRACT

A spooling device for storing and dispensing a cable. The device can store and deploy an optical jumper cable without exposure of excess cable cordage and without tangling.

19 Claims, 10 Drawing Sheets

SPOOLING DEVICE FOR AN OPTICAL FIBER JUMPER CABLE

CROSS-REFERENCES TO RELATED APPLICATIONS

This application claims the benefit of U.S. patent application Ser. No. 60/234,515, filed Sep. 20, 2000, and U.S. patent application Ser. No. 60/287,070, filed Apr. 27, 2001. Each application is expressly incorporated herein by reference in its entirety.

FIELD OF THE INVENTION

The present invention relates to a spooling device and, in particular, to a spooling device for an optical fiber jumper cable that allows for connection between fiber optic cables and test equipment for performing diagnostic testing, or for connection between fiber optic cables and transmitting or receiving equipment.

BACKGROUND OF THE INVENTION

Fiber optic cables are widely used in telecommunication systems to carry optical signals. These fiber cables can be miles in length. Cable performance and troubleshooting can be routinely achieved by conducting various tests on the fiber cable. These tests are ordinarily performed at the location of fiber termination.

Fiber cable testing and diagnostic procedures typically require connecting the optical cable to be tested to various diagnostic and/or test equipment. Each optical fiber strand in a cable is terminated with a connector. There are several different types of connectors with variations of each type. Often the connectors differ from installation to installation and furthermore from the test equipment to the terminated cable. Oftentimes the cables to be tested are numerous and also in close proximity. Fiber optic cable testing often requires that the cable to be tested be connected to the diagnostic equipment by an optical fiber jumper cable (or jumper). Because it is often necessary to test a great number of fiber cables that may be located close to one another, and because optical fiber jumper cables tend to become tangled, cable testing can become a complicated and messy task: Furthermore, a tangled mass of optical fiber jumpers can lead to damage to the jumpers themselves, thereby increasing the possibility of erroneous test results and further increasing testing time and associated costs.

Accordingly, there exists a need for a method for testing fiber optic cables that minimizes and/or eliminates the disadvantages noted above. A need also exists for a device that allows for the ready connection of a terminated fiber strand to a piece of test equipment without the complications associated with the use of loose jumper cables. The present invention seeks to fulfill these needs and provides further related advantages.

SUMMARY OF THE INVENTION

The present invention provides a device for storing and dispensing an optical fiber jumper cable. The device is a spooling device that can store and readily deploy the jumper without the exposure of excess jumper cordage and without jumper tangling. The device safely stores, dispenses, and retracts the optical fiber jumper. The spooling device includes a housing for the jumper cable; a spool about which the jumper cable is wound; a cover for maintaining the spool within the housing; and a lid for enclosing the housing and jumper cable.

In operation, a fixed length of the jumper can be unwound from the spool such that the fiber connector at one end of the jumper exits the spooling device from an access port in the device's housing. A fixed length of jumper that includes the other end of the jumper with its associated connector is then removed from the spool's center through the cover and laid in the opening between the cover and lid and then the device's lid is closed. The jumper's connectors are then mated to the test equipment and the optical fibers to be tested while safely enclosing the remainder of the jumper cable within the device.

In addition to readily connecting a fiber cable to be tested to testing equipment, the device of the invention is effective in organizing, protecting, and securing an optical fiber jumper cable for testing or cross-connecting in a patch panel.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention provides a spooling device for an optical fiber jumper. The device of the invention is a dispensing and storage device for an optical fiber jumper in which the jumper cable can be readily deployed without the jumper becoming entangled. The device serves to protect and secure an optical fiber jumper cable for testing and/or cross-connecting with a patch panel. The device safely stores, and readily dispenses and retracts an optical fiber jumper cable. Multiple devices can be used to test many fiber cables in an organized manner.

Figure 1:
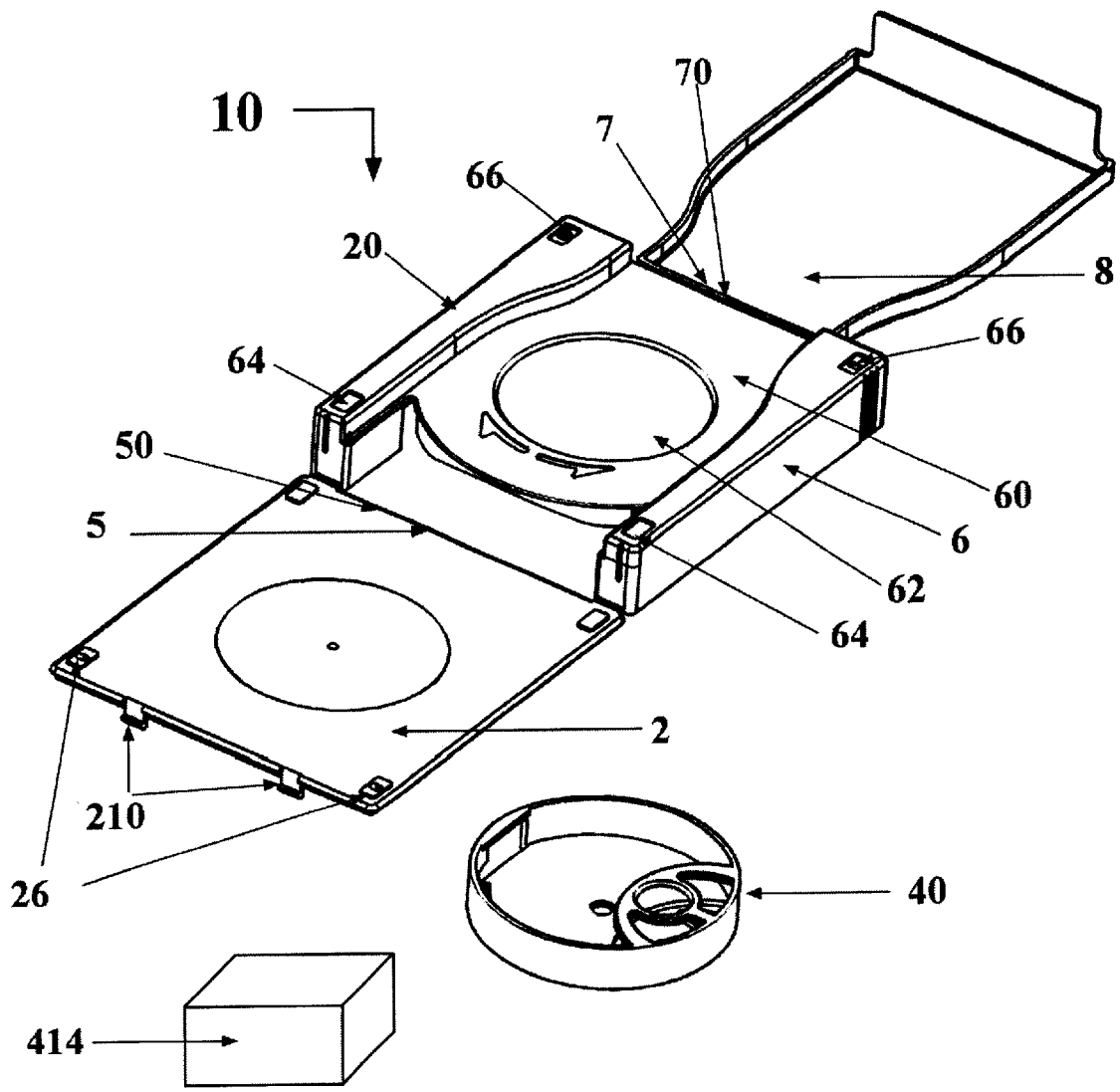
FIG. 1 is an exploded perspective view of a representative spooling device of the present invention.

Referring to FIG. 1, representative device 10 includes housing 20 and hub 40. Housing 20 includes bottom portion 2, body portion 6, and cover portion 8. In one embodiment, housing 20 is a single, molded plastic component in which bottom portion 2 is flexibly attached to body portion 6 through living hinge 5, and cover portion 8 is flexibly attached to body portion 6 through living hinge 7. Hub 40 rests in housing 20 secured by shelf 60 and bottom portion 2, and receives an optical fiber jumper cable. Shelf 60 secures hub 40 in housing 20 when cover portion 8 is open for accessing the cable. Foam pad 414 can be placed on a cable coiled inside the hub to prevent unwanted movement of the cable when winding or unwinding the cable.

Figure 2:
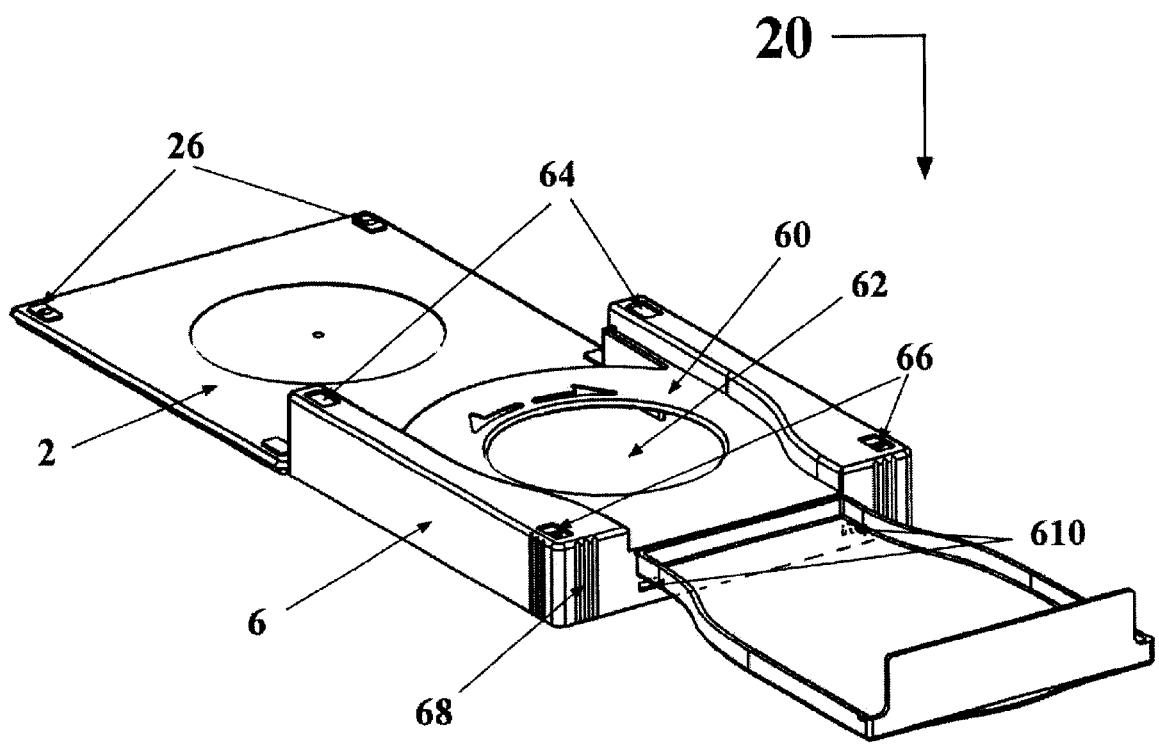
FIG. 2 is a three-dimensional view of a representative housing of a spooling device of the present invention.
Figure 7:
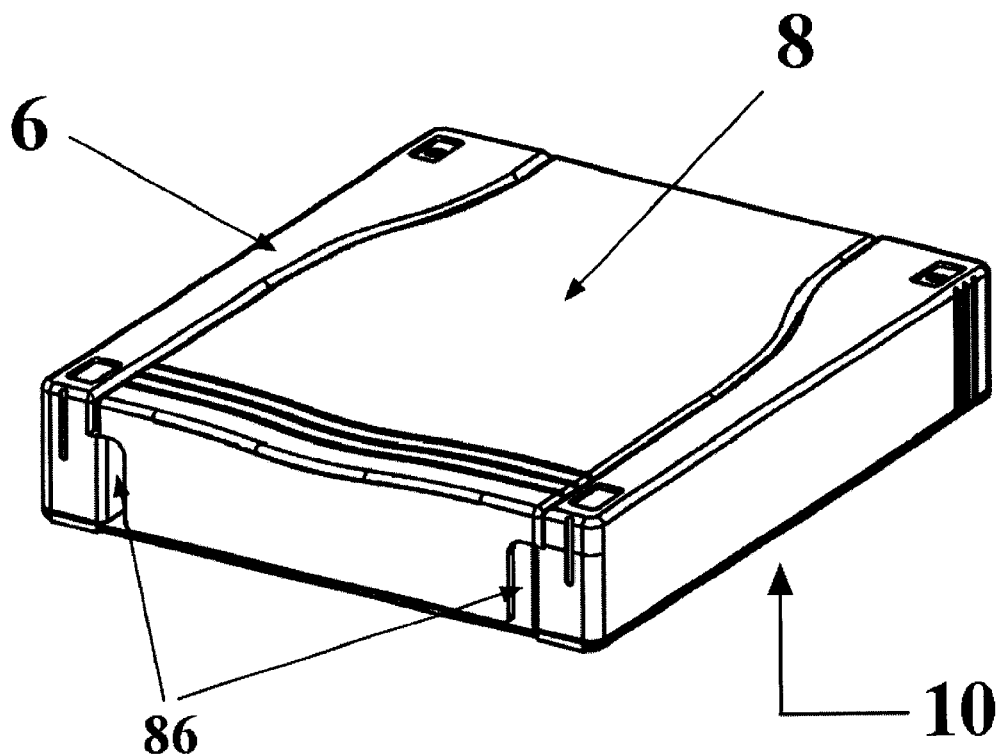
FIG. 7 is a perspective view of a representative device of the present invention illustrating the device in a storage mode.

A representative housing is illustrated in FIG. 2. Referring to FIG. 2, Housing 20 includes bottom portion 2, body portion 6, and cover portion 8. Housing 20 includes shelf 60 that includes aperture 62. Aperture 62 provide access to hub 40 to wind and unwind the cable into and out of the device. One end of the cable exits the device through aperture 62 (see FIG. 9). In one embodiment, body portion 6 includes nesting indents and bottom portion 6 includes nesting feet for securely stacking multiple devices. Nesting indents 64 and nesting feet 26 are illustrated in FIGS. 1 and 2. In one embodiment, the body portion includes tie down apertures 66 for tying down the device. In one embodiment, the body further includes ridges to assist in gripping the device. Ridges 68 are illustrated in FIG. 2. Bottom portion 2 can be secured to body portion 6 through clips 210 on bottom portion 2 that insert into clip slots 610 on body portion 6 when housing 20 is closed. Clips 210 are illustrated in FIGS. 1 and 5, and clip slots 610 are illustrated in FIG. 2. A closed housing is illustrated in FIG. 7.

As illustrated in FIG. 1, bottom portion 2 and cover portion 8 are flexibly attached to body portion 6 through living hinges 5 and 7, respectively. Bottom portion 2 is flexibly attached to body portion 6 along lower forward edge 50 of body portion 6, and cover portion 8 is flexibly attached to body portion 6 along upper rearward edge 70 of body portion 6. To secure bottom portion 2 to body portion 6, bottom portion 2 is folded rearwardly, and to close cover portion 8 on body portion 6, cover portion 8 is folded forwardly, as indicated by the arrows in FIG. 1.

Figure 3A:
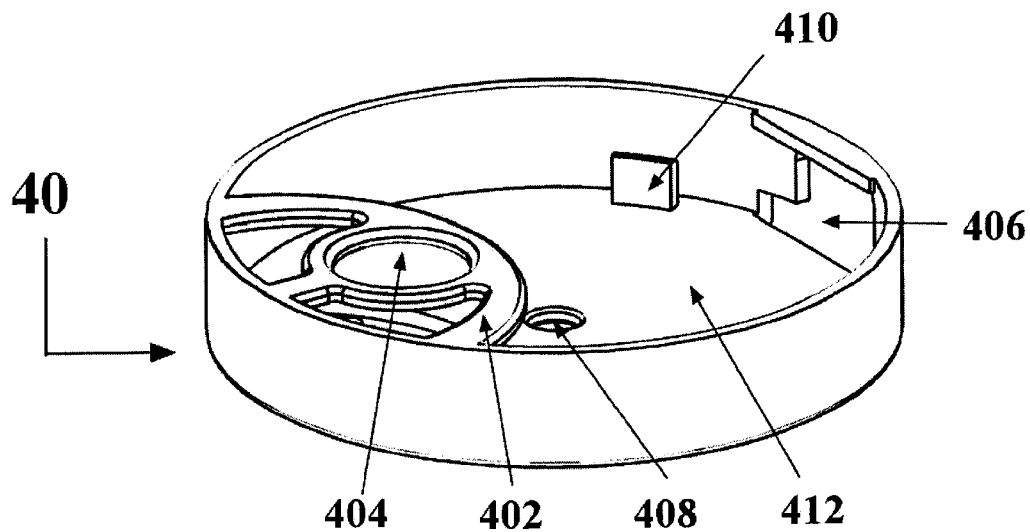
FIGS. 3A and 3B are top and bottom three-dimensional views, respectively, of a representative hub of a spooling device of the present invention.
Figure 3B:
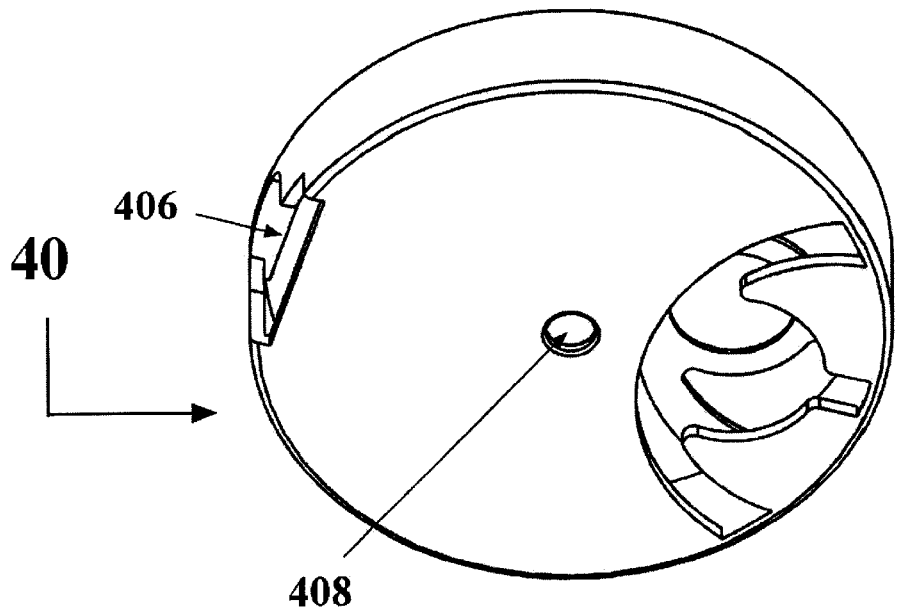

A representative hub of the device is illustrated in FIGS. 3A (top view) and 3B (bottom view). Referring to FIG. 3A, hub 40 includes tab 402 having aperture 404. Aperture 404 allows an operator's finger to rotate the hub to wind and unwind cable. Hub 4 also includes aperture 406 in the wall of the hub and aperture 408 in the floor of the hub. Aperture 406 allows one end of a cable to exit the hub. Aperture 408 receives axle peg 22 on bottom portion 2 (see FIG. 5A). When the bottom portion of the housing is closed and the hub secured within the housing, the hub can be rotated about the axle peg. Hub 40 can include retaining clip 410 located adjacent aperture 406 for securing a cable inside the hub with a fixed length dispensed from the hub. Cable can be introduced into the hub through wide access opening 412. Foam pad 414 (see FIG. 1) can be placed on a cable coiled inside the hub to prevent unwanted movement of the cable when winding or unwinding the cable.

Figure 4A:
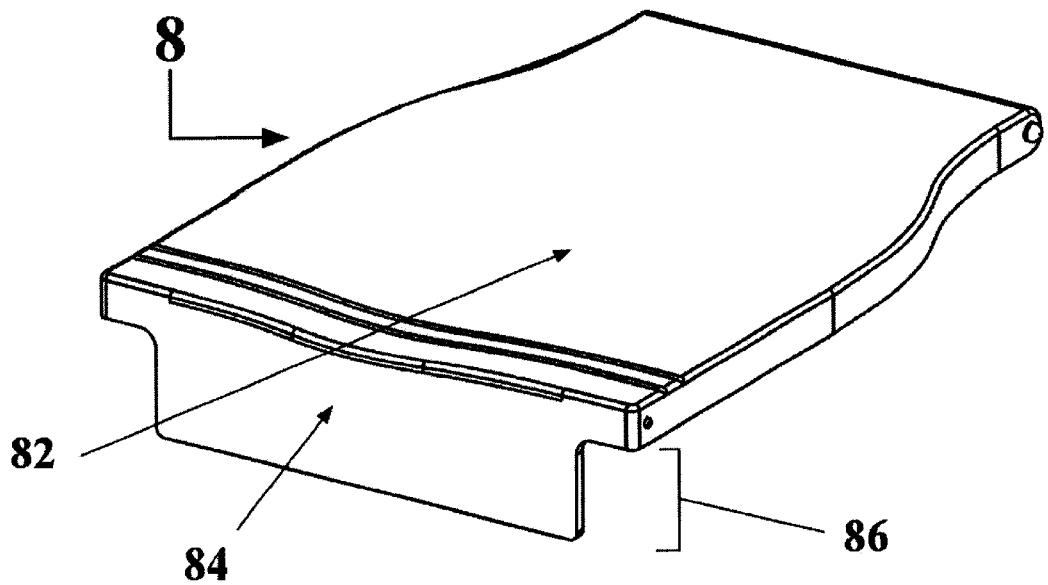
FIGS. 4A and 4B are three-dimensional views of outer and inner cover portions, respectively, of a representative spooling device of the present invention.
Figure 4B:
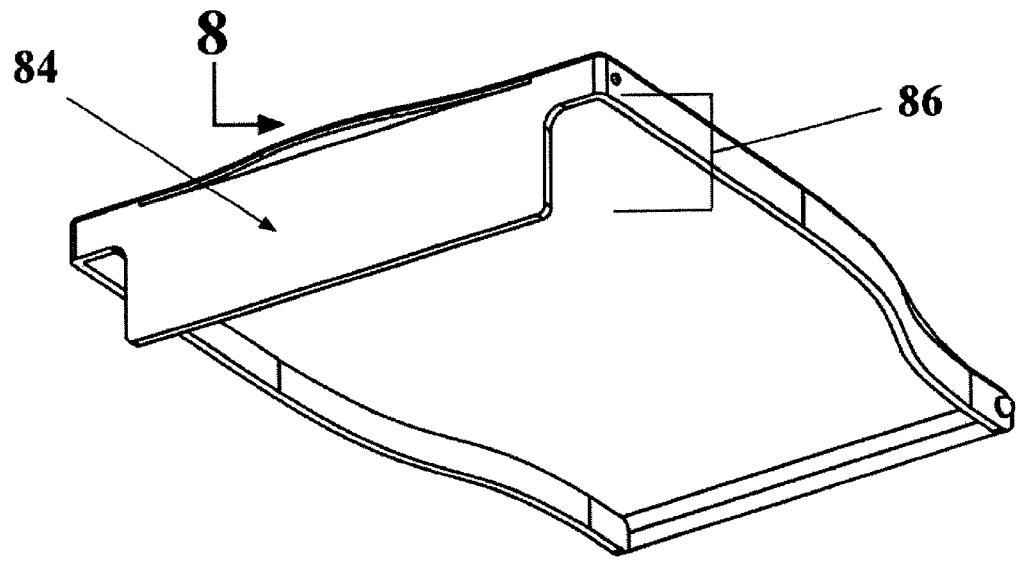

A representative cover portion is illustrated in FIGS. 4A and 4B. FIG. 4A illustrates the outer surface of the cover portion and FIG. 4B illustrates the inner surface of the cover portion. When closed, the cover portion protects that portion of the cable within the device. As noted above, the cover portion can be flexibly attached to the body portion through a living hinge. When the cover portion is opened, the cable can be accessed. As illustrated in FIGS. 4A and 4B, cover portion 8 includes major surface 82 and edge surface 84 having a length less than the length of surface 82 thereby defining notches 86. Notches 86 allow each end of the cable to exit the device when the cover portion is closed (see FIG. 10) and the cable is deployed for use. With respect to body portion 6, cover portion major surface 82 extends generally forwardly from living hinge 7. Cover portion edge surface 84 extends downwardly (with respect to body portion 6) from major surface 82.

Figure 5A:
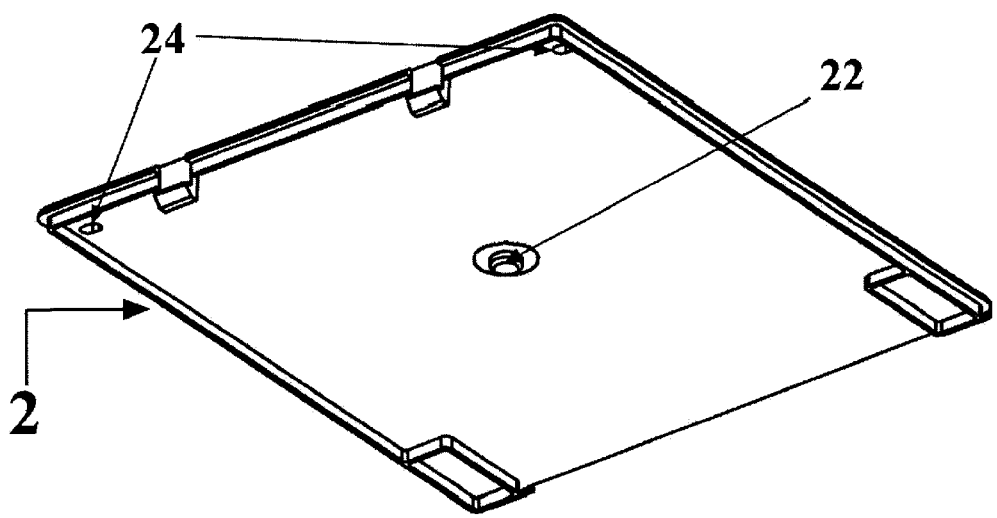
FIGS. 5A and 5B are three-dimensional views of inner and outer bottom portions, respectively, of a representative spooling device of the present invention.
Figure 5B:
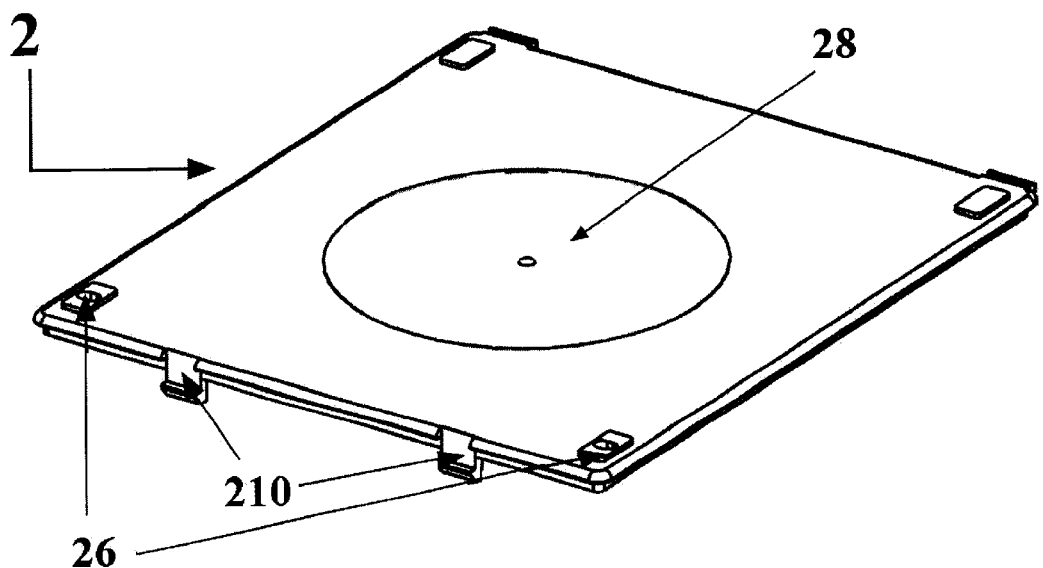

A representative bottom portion is illustrated in FIGS. 5A and 5B. FIG. 5A illustrates the inner surface of the bottom portion and FIG. 5B illustrates the outer surface of the bottom portion. As noted above, the cover portion can be flexibly attached to the body portion through a living hinge. When the bottom portion is closed, the hub is secured within the housing. As illustrated in FIG. 5A, bottom portion 2 includes axle peg 22 and lower tie down holes 24. As illustrated in FIG. 5B, bottom portion 2 includes clips 210 for securing the bottom portion to the body portion, and nesting feet 26. The outer surface of bottom portion 2 can include panel area 28, shown as a circle in the illustrated embodiment, for attaching labels or other indicia on the device.

Figure 6:
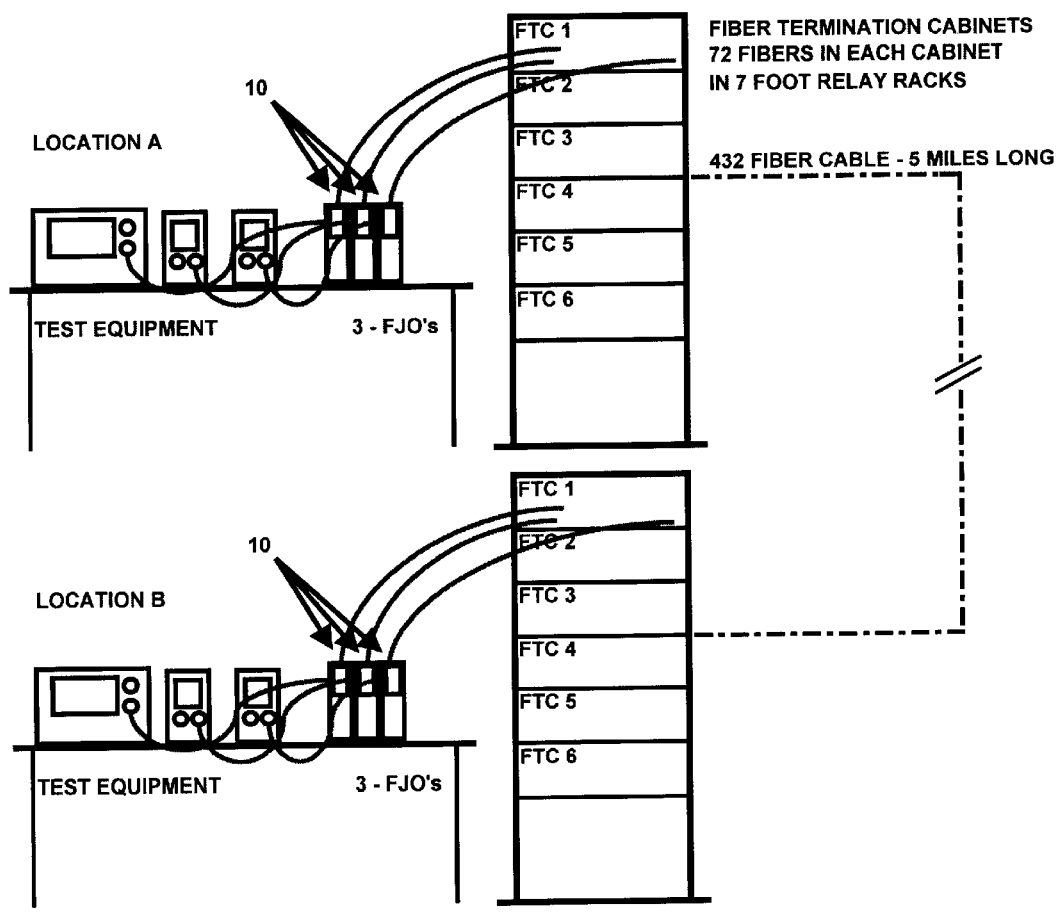
FIG. 6 is an illustration of the use of several representative devices of the invention connecting test equipment with optical fiber cables in fiber termination cabinets positioned at two locations along the route of a lengthy fiber cable.

A representative use of a plurality of devices of the present invention is illustrated in FIG. 6. Referring to FIG. 6, devices 10 are illustrated connecting optical fiber cables from fiber termination cabinets to test equipment at location A and location B. In this example, the fiber termination cabinets are connected by a lengthy (e.g., 5-mile) fiber cable.

In operation, a user can determine a fixed length of cordage of the optical fiber jumper cable and secure the cordage on the device's spool using retaining clip 410. The fixed length of jumper cable is then coiled into the center of the spool. The spool can then be rotated to wind the remaining length of cordage around the spool.

The spooling device can be labeled as to its contents, for example, connector types, fiber type, fiber length, purchase date, serial number, and other pertinent information to assist the user in selecting the appropriate optical fiber jumper cable stored in the device.

A perspective view of a representative device of the present invention is illustrated in FIG. 7. Referring to FIG. 7, device 10 encloses a jumper cable. The cable can be extended through notches 86 when the device is in use.

Figure 8:
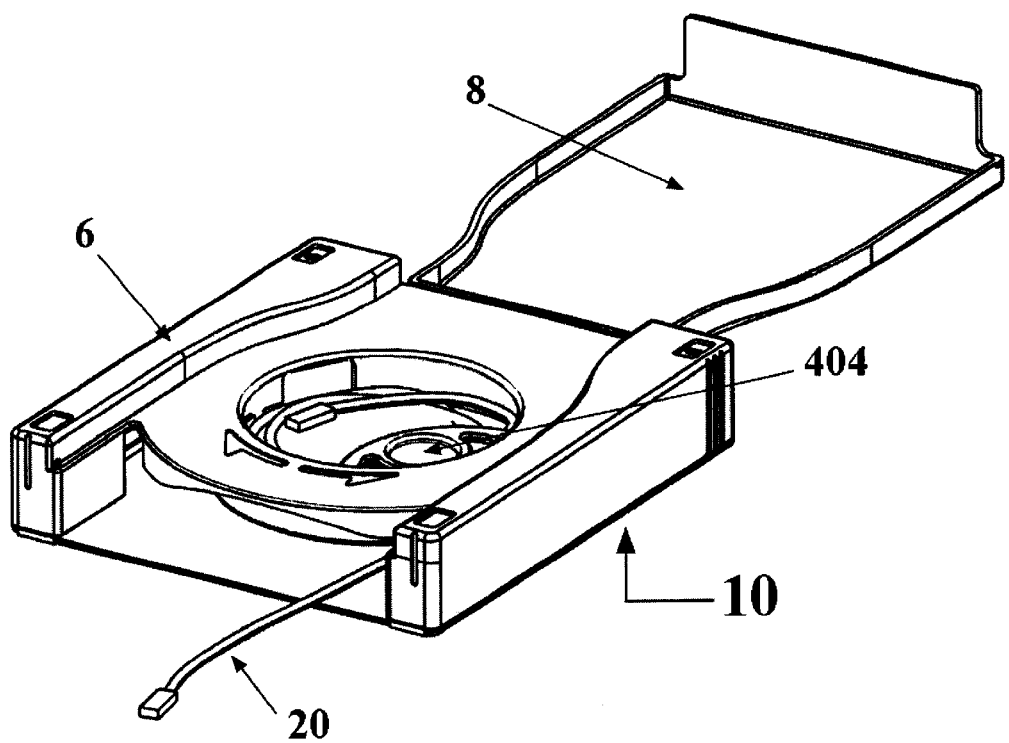
FIG. 8 is a perspective view of a representative device of the present invention illustrating one end of the optical fiber jumper cable dispensed for connection to either a piece of test equipment or to a fiber cable to be tested.

To dispense a portion of the optical fiber jumper, the device's cover portion is opened. Hub 40 is then rotated to unwind the jumper cable so that the jumper exits the device. In this manner, the jumper cable's fiber connector becomes available for connection. The length of jumper cable dispensed is controlled by rotating the hub. It is preferable that the user does not pull or otherwise stress the jumper cable. Referring to FIG. 8, jumper cable 20 can be manually dispensed from representative device 10 by placing a finger in aperture 404 and rotating the spool (as indicated by arrow) to dispense the jumper cable.

Figure 9:
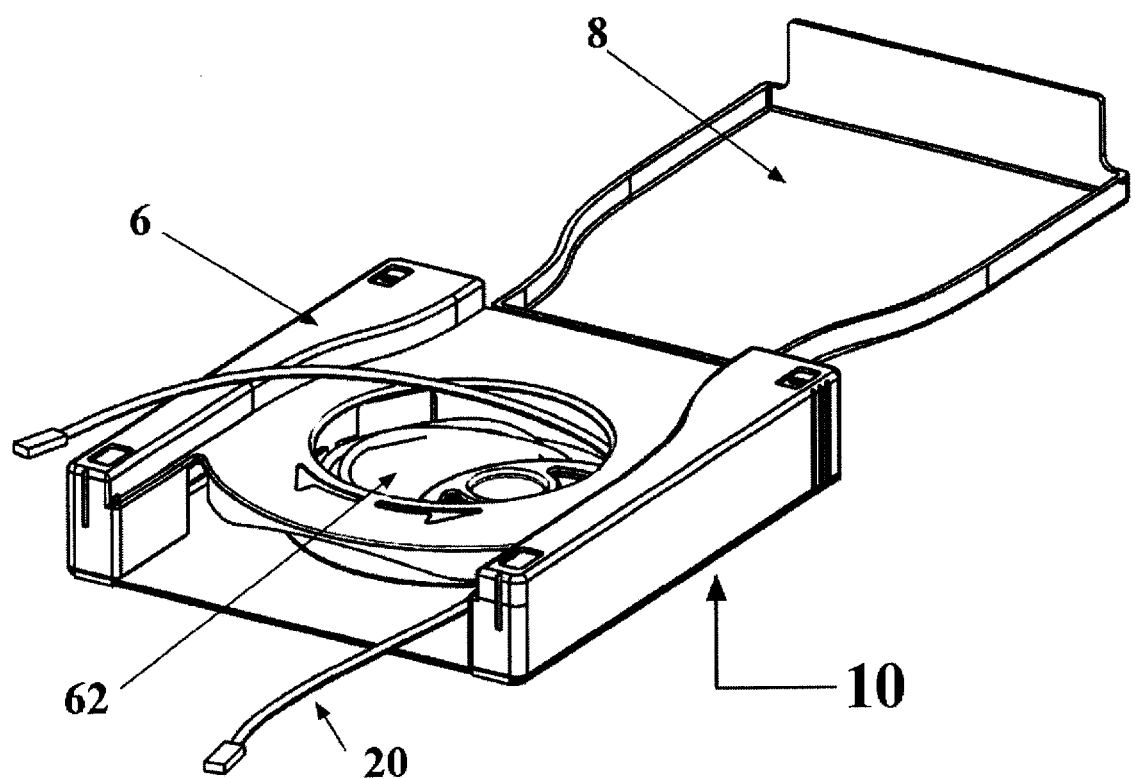
FIG. 9 is a perspective view of a representative device of the present invention illustrating the desired amount of jumper cable cordage dispensed from the device.
Figure 10:
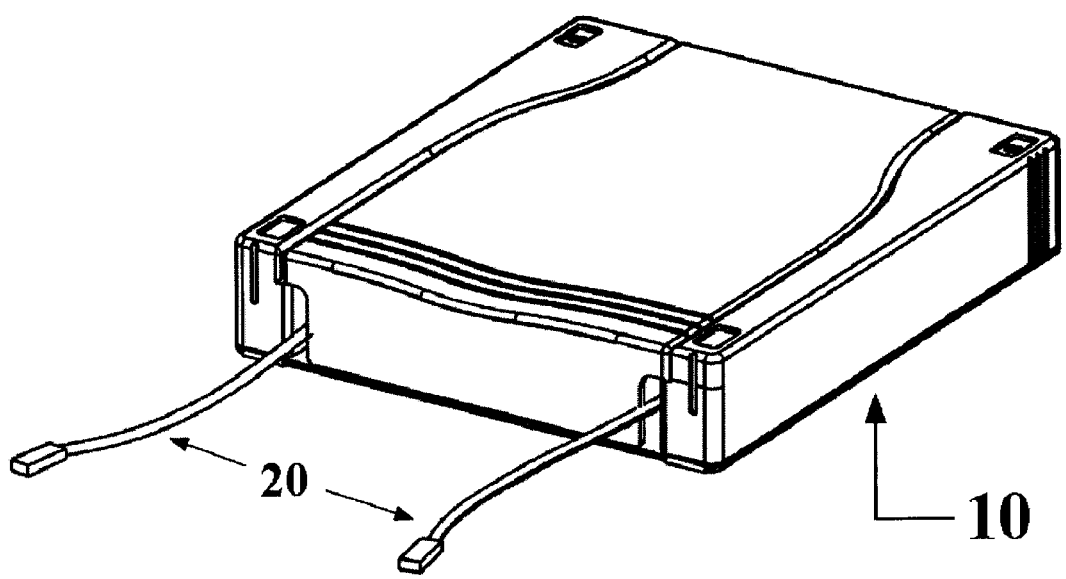
FIG. 10 is a perspective view of a representative device of the present invention illustrating both ends of the optical fiber jumper cable dispensed from the device and ready for connection.

Once the desired length of jumper cable is dispensed, the other end of the jumper cable with associated connector is removed from the device through apertures 412 and 62 as illustrated in FIG. 9. Once both ends of the jumper are dispensed from the device, cover portion 8 can be closed as illustrated in FIG. 10. In this way the jumper cable is now ready for connection and use.

The device of the invention can be assembled by placing hub 40 in housing 20, folding bottom portion 2 toward body portion 6, and inserting axle peg 22 into the axle peg receptacle, aperture 408. Bottom portion 2 is folded until clips 210 are secured by clip slots 610. The device can now be closed by folding cover portion 8 toward body portion 6, or a cable can be installed.

To install the cable, first determine the fixed length of cable to be dispensed from the device. Open cover portion 8 and rotate hub 40 until aperture 406 faces forwardly with respect to the device. Insert one end of the cable through aperture 406 place the cable in the hub securing the cable with retaining clip 410 at the point that has been determined to be the fixed length. Coil the fixed length into the center of the hub and insert pad 414 to prevent the cable from unwanted movement during winding and unwinding. Rotate the hub using aperture 404 to retract the remainder of the cable into the device and close cover portion 8. The device is then ready for use.

To use deploy cable from the device, open cover portion 8 and rotate the hub using aperture 404 to begin deploying the cable. Cable deployment can be assisted by gently pulling on the cable as it is deployed. Deploy the length of cable required for use. Remove the fixed length of cable from the center of the hub and close the cover portion making sure that each end of the deployed cable exits the device through notches 86. The cable ends from the deployed cable can now be attached as necessary while the remainder of the cable resides safely in the device.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A device for storing and dispensing a cable, comprising:

(a) a housing, comprising a body portion, bottom portion, and cover portion, wherein the bottom portion and cover portion are adapted to substantially enclose the body portion when in a closed position, the cover portion comprising an edge surface and an adjoining a major surface, the length of the edge surface being less than the length of the adjoining major surface, to define aperture at each end of the edge surface, wherein said two apertures are defined on a single surface of the device when the cover is in the closed position; and (b) a hub for receiving a cable, wherein the hub is received by the housing and is rotatable within the housing.

2. The device of claim 1, wherein housing is a single, molded plastic component.

3. The device of claim 2, wherein the bottom portion is flexibly attached to the body portion by a hinge.

4. The device of claim 2, wherein the cover portion is flexibly attached to the body portion by a hinge.

5. The device of claim 2, wherein the body portion comprises a rearward upper edge and a forward lower edge, wherein the cover portion is flexibly attached to the body portion at the rearward upper edge, and wherein the bottom portion is flexibly attached to the body portion at the forward lower edge.

6. The device of claim 1, further comprising a cable.

7. The device of claim 6, wherein the cable comprises an optical fiber jumper cable.

8. A system, comprising:

(a) device for storing and dispensing a cable, comprising (i) a housing, comprising a body portion, bottom portion, and cover portion, wherein the bottom portion and cover portion are adapted to substantially enclose the body portion when in a closed position, the cover portion comprising an edge surface and an adjoining a major surface, the length of the edge surface being less than the length of the adjoining major surface to define an aperture at each of the edge surface, wherein said two apertures are defined on a single surface of the device when the cover is in the closed position; and (ii) a hub for receiving a cable, wherein the hub is received by the housing and is rotatable within the housing; and (b) a cable, wherein the cable is coiled within the hub.

9. The system of claim 8, wherein housing is a single, molded plastic component.

10. The system of claim 9, wherein the bottom portion is flexibly attached to the body portion by a hinge.

11. The system of claim 9, wherein the cover portion is flexibly attached to the body portion by a hinge.

12. The system of claim 9, wherein the body portion comprises a rearward upper edge and a forward lower edge, wherein the cover portion is flexibly attached to the body portion at the rearward upper edge, and wherein the bottom portion is flexibly attached to the body portion at the forward lower edge.

13. The system of claim 8, wherein the cable comprises an optical fiber jumper cable.

14. A method for dispensing a cable, comprising dispensing a length of cable from a system, wherein the system comprises:

(a) device for storing and dispensing a cable, comprising (i) a housing, comprising a body portion, bottom portion, and cover portion, wherein the bottom portion and cover portion are adapted to substantially enclose the body portion when in a closed position, the cover portion comprising an edge surface and an adjoining a major surface, the length of the edge surface being less than the length of the adjoining major surface to define an aperture at each end of the edge surface, wherein said two apertures are defined on a single surface of the device when the cover is in the closed position; and (ii) a hub for receiving a cable, wherein the hub is received by the housing and is rotatable within the housing; and (b) a cable, wherein the cable is coiled within the hub.

15. The method of claim 14, wherein housing is a single, molded plastic component.

16. The system of claim 15, wherein the bottom portion is flexibly attached to the body portion by a hinge.

17. The system of claim 15, wherein the cover portion is flexibly attached to the body portion by a hinge.

18. The system of claim 15, wherein the body portion comprises a rearward upper edge and a forward lower edge, wherein the cover portion is flexibly attached to the body portion at the rearward upper edge, and wherein the bottom portion is flexibly attached to the body portion at the forward lower edge.

19. The system of claim 14, wherein the cable comprises an optical fiber jumper cable.

* * * * *

UNITED STATES PATENT AND TRADEMARK OFFICE
CERTIFICATE OF CORRECTION

PATENT NO. : 6,745,971 B1
DATED : June 8, 2004
INVENTOR(S) : T.K. Renzoni

It is certified that error appears in the above-identified patent and that said Letters Patent is hereby corrected as shown below:

Column 5,
Line 44, "an adjoining a" should read -- an adjoining --
Line 47, "aperture at" should read -- an aperture at --
Line 52, "wherein housing" should read -- wherein the housing --

Column 6,
Line 2, "(a) device" should read -- (a) a device --
Line 2, "comprising" should read -- comprising: --
Line 8, "adjoining a" should read -- adjoining --
Line 18, "wherein housing" should read -- wherein the housing --
Line 35, "(a) device" should read -- (a) a device --

Signed and Sealed this

Twenty-eighth Day of December, 2004

JON W. DUDAS
*Director of the United States Patent and Trademark Office*